United States Patent [19]
Cody et al.

[11] 4,401,056
[45] Aug. 30, 1983

[54] FEEDING DEVICE FOR CAGED ANIMALS

[75] Inventors: Joe C. Cody, Sullivan; Curt Rettke, Gray Summit, both of Mo.

[73] Assignee: Ralston Purina Company, St. Louis, Mo.

[21] Appl. No.: 372,871

[22] Filed: Apr. 29, 1982

[51] Int. Cl.³ .............................................. A01K 5/00
[52] U.S. Cl. .......................................... 119/18; 119/54
[58] Field of Search ...................... 119/18, 52 R, 53.5, 119/54

[56] References Cited
U.S. PATENT DOCUMENTS

| | | | |
|---|---|---|---|
| 1,491,210 | 4/1924 | Steinback | 119/52 R |
| 1,595,758 | 8/1926 | Collins | 119/54 |
| 3,951,107 | 4/1976 | Doty | 119/52 R |
| 4,180,014 | 12/1979 | Mathews | 119/52 R |

*Primary Examiner*—Hugh R. Chamblee
*Attorney, Agent, or Firm*—Virgil B. Hill

[57] ABSTRACT

A gravity flow feeder for caged animals, especially fur bearing animals such as mink is disclosed wherein said feeder comprises an open ended container with front, side, rear and bottom panels. The bottom panel slopes forward from the rear panel underneath the bottom edge of the front panel to form a ramp, wherein the bottom panel forms a trough beyond the front panel and the gap between the bottom of the trough and the bottom edge of the front panel provides an opening to permit flow of feed into the trough from the container. A screen overlays the inside of the front panel, said screen being of slightly larger vertical dimensions than the front panel to at least partially cover the opening and of slightly smaller horizontal dimensions. Attachment of the screen on the top edge of the front panel and the dimensions of the screen permit lateral and rearward movement of the screen. This enables the animal by moving the screen to break up any clumps and insure a continuous supply of feed yet not provide an opening which will provide an escape route for the animal.

11 Claims, 4 Drawing Figures

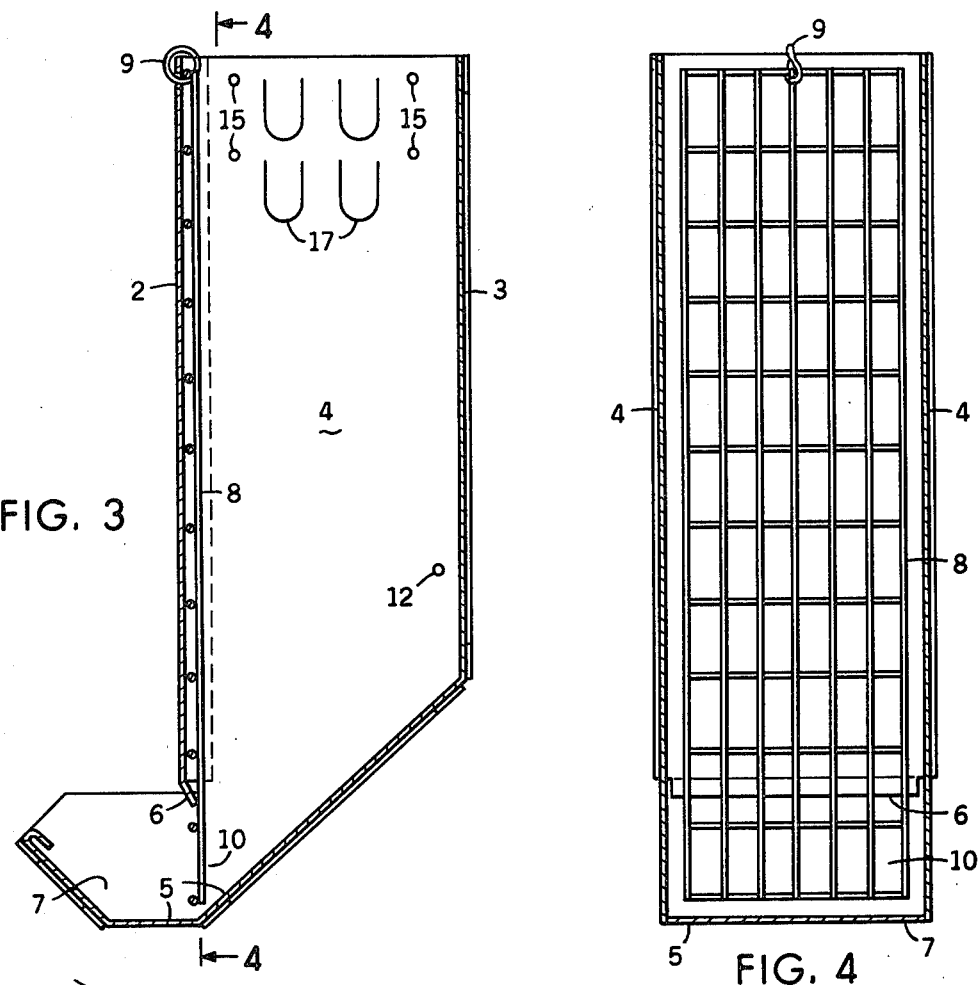
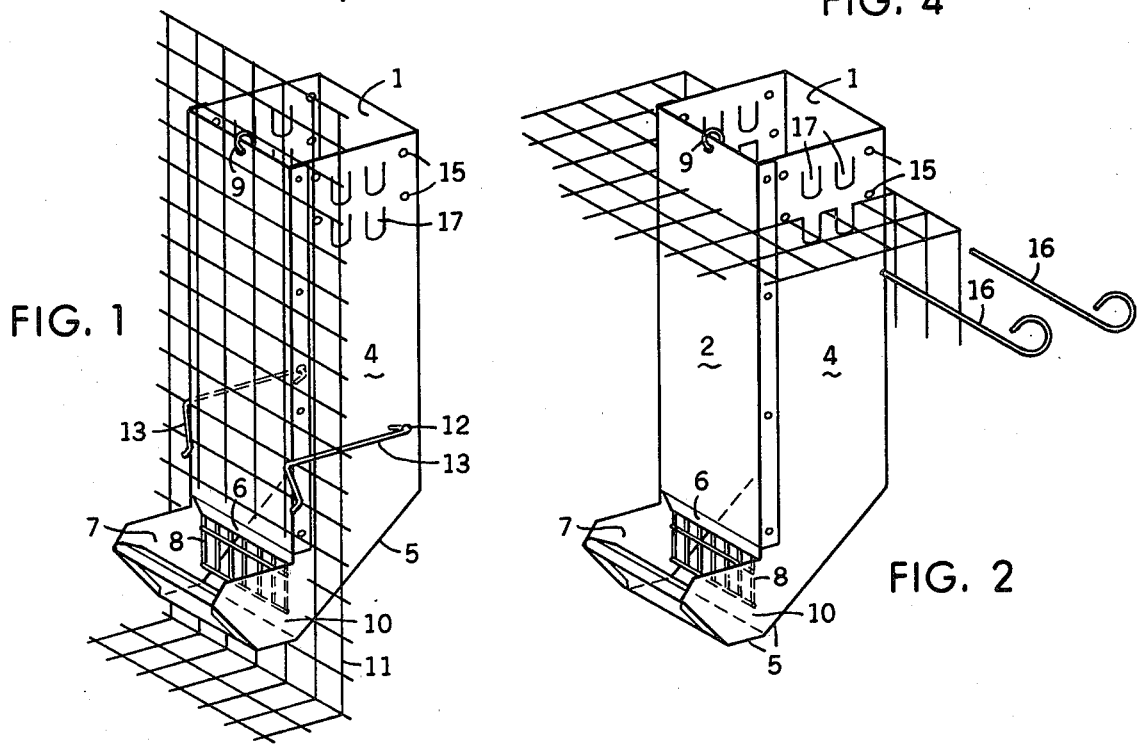

FEEDING DEVICE FOR CAGED ANIMALS

BACKGROUND OF THE INVENTION

The present invention generally relates to a gravity flow feeder for caged animals which is readily adaptable to cages in a number of different feeding positions.

The feeding of caged animals, particularly fur bearing animals such as mink, usually involve the use of moist, sticky clumps of feed which are difficult to handle by the rancher. The feed is often placed in the wire mesh on the top of the cage and the mink will reach up and pull a quantity down for consumption. Quite often a large percentage of the feed will fall through the wire bottom of the cage onto the ground thereby being wasted. A suggested solution to this problem is described in U.S. Pat. No. 3,527,554 wherein a support is attached to the inside of the cage to thereby provide a table for the feed and prevent loss through the bottom of the cage.

By the same token, gravity feeders which can be attached to the cages to permit continued consumption by the animal suffer from several problems. Clumping or agglomeration of the feed often occurs in the container which interrupts the flow of food to the animal. Furthermore, the use of a feeding container which empties into the cage and can be filled by the rancher on a periodic basis, necessitates an opening into the cage. The opening can also provide a possible means of escape for the animal, particularly where the animal is quite small as in the case of mink kits or other young animals.

It is therefore an object of the present invention to provide a gravity flow feeder for caged animals, especially mink, which avoid the aforesaid difficulties.

It is a further object of the present invention to provide a gravity flow feeder which is readily adaptable or attachable to cages in at least several alternative configurations.

It is a further object to provide a gravity flow feeder which has an animal regulated supply of feed and avoids continual clumping of the feed during delivery to the animal.

It is a further object to provide a gravity flow feeder which adapts to a cage and avoids the creation of an opening through which the animal can escape.

These and other objects are accomplished in the present invention as hereinafter described.

SUMMARY OF THE INVENTION

A gravity flow feeder for caged animals especially mink is provided for which comprises, an open ended container with a rectangular shaped opening at the top, for placing the feed in the container, the container having front, rear, side and bottom panels. The front panel has downward vertical dimensions or a length that is greater than the rear panel.

The bottom panel of the container is attached to the rear panel and forms a ramp in the bottom of the container by sloping forward underneath the bottom edge of the front panel, with an extension beyond the front panel being in the form of a trough. The gap created between the bottom edge of the front panel and the bottom of the trough provide an opening through which food can pass by gravity from the container into the trough. The container has side panels which are attached to the front, rear, and bottom panels to enclose the container as well as provide sides for the trough.

A screen is attached to the top of the front panel of the container and overlays the panel on the inside of the container. The screen has greater vertical dimensions than the front panel thereby permitting the screen to extend beyond the bottom edge of the front panel to at least partially cover the opening created by the bottom of the trough and the bottom edge of the front panel. Preferably, the screen will not touch the bottom of the trough so that with attachment at the top of the front panel this will permit slight rearward movement of the screen until it abuts the ramp formed by the sloping bottom panel. This construction which permits a slight rearward movement of the screen is a significant feature of the present invention as described below. By the same token, it is also an important feature of the present invention that the screen which overlays the front panel on the inside of the container be of slighter smaller horizontal dimensions than the front panel, which because of attachment at the top of the front panel also permits lateral movement of the screen until it abuts the side panels which form the sides of the trough.

The use of the screen which has some degree of lateral and rearward movement is a simple but ingenious device which effectively limits escape by the animal, yet because animals such as mink can reach the screen with their paws, it provides a self regulated and continuous supply of feed without clumping or agglomeration to interrupt flow to the animal. This is achieved by the lateral and rearward movement of the screen to break up any clumps and insure a continuous supply of feed in the trough. On the other hand, movement of the screen is restricted laterally by the sides of the trough and rearwardly by the bottom panel which slopes from the bottom of the rear panel forward to form the trough. This small amount of movement is sufficient to break up clumps of feed yet insufficient to provide an escape route for the animal either through the opening or through the gaps created by movement of the screen. Fur bearing animals such as mink are remarkably adaptable to use of this type of device and it provides a labor saving means for the rancher who can be assured the animals are receiving a continuous and uninterrupted supply of feed.

DESCRIPTION OF THE DRAWINGS

FIG. 1 shows a perspective view of the feeder of the present invention and its attachment to the side of a cage.

FIG. 2 shows a perspective view of the feeder of the present invention and its attachment through the top of a cage.

FIG. 3 shows a cutaway side view of the feeder of the present invention with one side panel removed.

FIG. 4 shows a cutaway rear view of the feeder of the present invention with the rear panel removed.

DETAILED DESCRIPTION OF THE DRAWINGS

The completed gravity flow feeder of the present invention is shown generally in reference to FIG. 1, which further illustrates a non-limiting means of attachment of the feeder to the cage.

The flow feeder comprises an opened ended container with a rectangular shaped opening 1 at the top of the container. The container is further defined by a front panel 2, a rear panel 3, side panels 4 and a bottom panel 5. The front panel 2 has vertical edges or a vertical length which is greater than or larger than those of the rear panel 3. The bottom panel 5 is attached to the rear panel 3 along the bottommost edge of the rear panel 3 and slopes forwardly thereby forming a ramp by sloping forward to a point underneath the bottom edge 6 of the front panel 2. The bottom panel 5 then extends outwardly from the bottom edge 6 preferably on the same plane as the top of the container to provide a trough 7, for deposit of the feed into the cage. The side panels 4 attached to the front rear and bottom panels enclose the container and further provide sides for the trough 7. The bottom edge 6 of the front panel 2 and the bottom of the trough define an opening 10 from the container into the trough. A screen 8 is attached somewhere to the top edge of front panel 2, and preferably at the midpoint 9 of the top edge with a holding ring or similar device. The exact point of attachment of the screen to the top edge of the front panel 2 is not critical although the maximum flexibility in movement is achieved by attachment at the midpoint 9. The screen 8 overlaps the front panel 2 on the inside of the container and extends beyond the bottom edge 6 of the front panel 2 to at least partially cover the opening 10 formed by the bottom edge 6 and the bottom of the trough 7.

FIG. 1 generally illustrates a typical non-limiting means of attachment of the feeding device of the present invention to the side wall 11 of a wire cage. An opening is cut into the wire cage wall 11 to permit insertion of the trough 7 into the interior of the cage. The feeding device is supported on the cage wall 11 by single holes 12 on the two side panels 4 through which wire hooks 13 can be inserted to lock on the wire cage wall 11 thereby effectively securing the feeding device to the sidewalls of the cage.

FIG. 2 again illustrates an alternative but non-limiting way of attaching the feeding device of the present invention to a cage, particularly a wire mesh cage used for the raising of fur bearing animals such as mink. An opening is made in the top wire wall 14 of the cage to permit insertion of the feeding device down into the interior of the cage. At least one set of holes 15 can be provided in the top portions of both side panels 4 through which wire hooks or rods 16 or the like can be inserted to keep the device from falling into the cage. If desired, a number of different sets of holes along the vertical axis of side panels 4 may be added to permit raising or lowering of the container as the case may be for convenience of feeding. This is illustrated in FIG. 2 wherein a top set of holes can be added which would permit lowering of the feeding device. Another preferred, but non-limiting embodiment of the present invention is the use of at least one tab or set of Tabs 17 on each of the side panels 4 which can be bent over the wire mesh to further assist in securing the feeding device to the cage. A tab or set of tabs can alternatively be added at a higher or lower elevation if desired on the side panels commensurate with another set of holes to permit raising or lowering of the device as the case may be.

FIG. 3 specifically shows a side view of the feeding device and specifically shows the bottom panel 5 connected to the rear panel 3 and sloping forwardly to a point underneath the bottom edge 6 of the front panel 2. In this manner, the bottom panel 5 forms a ramp to permit gravity flow from the container into the trough 7 which is formed by an extension of the bottom panel 5 beyond the bottom edge 6 of the front panel 2 and in the same plane as bottom edge 6. The bottom edge 6 of the front panel 2 and the bottom of the trough 7 define an opening 10 through which feed can flow from the container into the trough. The screen 8 is attached to the top edge of the front panel 2 and extends beyond the bottom edge 6 of the front panel to at least partially cover the opening 10. It may be seen that screen 8 preferably does not extend to the bottom of the trough to completely cover the opening 10, since if it did, it would have no rearward movement thereby restricting its usefulness as a means of breaking clumps of feed. Furthermore, rearward movement of the screen 8 is restricted by the ramp formed by bottom panel 5, thereby preventing rearward movement to such an extent that an escape route for the animal would be provided through the opening.

FIG. 4 showing a rear view of the feeder cut away along axis 2—2 of FIG. 1 with the rear panel 3 removed and clearly shows the screen 8 which overlays the inside of the front panel 2 having vertical dimensions greater than the front panel extending beyond the bottom edge 6 of the front panel 2 but not touching the bottom of the trough 7, thereby at least partially covering opening 10. The exact degree to which the vertical dimensions exceed the front panel is not critical depending on the extent of rearward movement of the screen that is desired, the slope of the ramp formed by the bottom panel 5 and other factors relative to flowability of the feed or likelihood of providing an escape route for the animal. FIG. 4 further shows that the horizontal dimensions of the screen 8 are somewhat smaller than the front panel 2 to permit lateral movement of the screen, because of attachment at the top edge of the front panel 2. The exact degree to which the horizontal dimensions of the screen should be smaller than the front panel is not critical and may be altered depending on the degree of lateral movement desired, because of flowability of the feed or the degree to which an escape route might be provided for the animal because of the smaller horizontal dimensions of the screen 8. The side panels 4 which also provide the sides for the trough 7 restrict movement of the screen in a lateral direction. It is therefore apparent from an examination of the above feeding device that a simple but ingenious apparatus has been devised which will enable the animal, by reaching the screen and moving it laterally or rearwardly, to continuously break up any clumps of feed to insure a continuous supply. Furthermore, since the degree to which the screen is able to move is restricted, this prevents the opening into the container from being used as an escape route for the animal.

Having described the present invention with reference to the specific embodiments set forth above it is to be understood that numerous variations may be made without departing from the spirit of the present invention and it is intended to encompass such reasonable variations or equivalents within its scope.

What is claimed is:

1. A gravity flow feeder for caged animals comprising;

a rectangularly shaped container means with an open top having a bottom panel which slopes forward to a point beneath the bottom edge of the front panel of the container to create an opening in the bottom of said container, wherein a trough is provided adjacent to the bottom opening of the container on the outside thereof;

said front panel having a screen attached to the top edge thereof and overlaying the front panel on the inside of the container said screen being of a vertical length sufficient to at least partially cover the bottom opening of the container, said screen being of lesser width than said front panel whereby said screen has lateral and rearward movement so that as feed is added to the container it flows through the bottom opening into the trough and as the screen is moved by the animal a continual supply of feed from the container into the trough is provided.

2. The feeder as set forth in claim 1 wherein said container means has front, rear, bottom and side panels and said front panel has vertical edges of greater length than said rear panel.

3. A feeder as set forth in claim 1 wherein said bottom panel extends beyond the bottom edge of the front panel of said container to form said trough.

4. A feeder as set forth in claim 1 wherein said screen is of a vertical length sufficient to at least partially cover the bottom opening of said container but does not touch the bottom of said trough.

5. A feeder as set forth in claim 2 wherein said side panels are attached to the front, rear and bottom panels thereby enclosing the container and providing sides for the trough.

6. A feeder as set forth in claim 1 wherein said screen is attached to the top edge of the front panel at the midpoint of said top edge.

7. A feeder as set forth in claim 1 wherein said container has side panels with at least a set of holes for insertion of hooking means to attach said feeder to a cage.

8. A feeder as set forth in claim 1 wherein said container has side panels with at least a set of holes in the top portion of said panels for insertion of hooking means to secure said feeder to a cage.

9. A gravity flow feeder for caged animals such as mink comprising;
a rectangularly shaped container means with an open top having front, rear, side and bottom panels;
said bottom panel being attached to said rear panel and having a ramp sloping forward to a point beneath the bottom edge of the front panel of the container to provide an opening in the bottom of said container, said bottom panel extending beyond the front panel and forming a trough on the outside of the container,
said side panels being attached to the front, rear, and bottom panels thereby enclosing the container and providing sides for said trough,
said front panel having a screen attached to the top edge thereof and overlaying the front panel on the inside of the container, said screen being of a vertical length sufficient to at least partially cover the bottom opening of the container, but not touch the bottom of said trough, said screen being of lesser width than said front panel whereby said screen has lateral and rearward movement so that as feed is added to the container it flows by gravity through the bottom opening into the trough and as the screen is moved by the animal a continual supply of feed from the container into the trough is provided.

10. A feeder as set forth in claim 9 wherein rearward movement of said screen is restricted by the ramp formed by said bottom panel.

11. A feeder as set forth in claim 9 wherein lateral movement of said screen is restricted by said side panels.

* * * * *